(12) United States Patent
Miyasa et al.

(10) Patent No.: US 12,552,177 B2
(45) Date of Patent: Feb. 17, 2026

(54) INK JET PRINTING METHOD AND INK JET PRINTING SET

(71) Applicant: SEIKO EPSON CORPORATION, Tokyo (JP)

(72) Inventors: Ryota Miyasa, Matsumoto (JP); Takayoshi Kagata, Shiojiri (JP); Toshiaki Oguchi, Shiojiri (JP); Hiromu Miyazawa, Azumino (JP)

(73) Assignee: SEIKO EPSON CORPORATION (JP)

(*) Notice: Subject to any disclaimer, the term of this patent is extended or adjusted under 35 U.S.C. 154(b) by 173 days.

(21) Appl. No.: 18/495,035

(22) Filed: Oct. 26, 2023

(65) Prior Publication Data
US 2024/0140104 A1 May 2, 2024

(30) Foreign Application Priority Data
Oct. 28, 2022 (JP) .................. 2022-173340

(51) Int. Cl.
*B41J 2/21* (2006.01)
*B41J 2/01* (2006.01)
(Continued)

(52) U.S. Cl.
CPC .............. *B41J 2/2107* (2013.01); *B41J 2/01* (2013.01); *B41J 2/2114* (2013.01); *B41J 3/4078* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002;
(Continued)

(56) References Cited

U.S. PATENT DOCUMENTS

| 6,071,620 A * | 6/2000 | Kuczynski | ............... B41N 6/00 428/512 |
| 2001/0001103 A1* | 5/2001 | Noguchi | ............... C09D 11/30 524/839 |

(Continued)

FOREIGN PATENT DOCUMENTS

| EP | 1533347 A1 * | 5/2005 | ............... B41J 2/01 |
| JP | 2014-083780 A | 5/2014 | |

*Primary Examiner* — Manish S Shah
(74) *Attorney, Agent, or Firm* — Harness, Dickey & Pierce, P.L.C.

(57) ABSTRACT

An ink jet printing method includes an ejection step of ejecting an ink jet ink composition containing a sublimation dye from a recording head so as to be adhered to an intermediate transfer medium A; and a transfer step of transferring the sublimation dye adhered to the intermediate transfer medium A by sublimation to a cloth B. In the ink jet printing method described above, an affinity parameter Ln (gamma) at 25° C. calculated by a COSMO-RS method between the sublimation dye and a member of a surface of the cloth B to which the sublimation transfer is performed is 5 or less.

12 Claims, 3 Drawing Sheets

(51) Int. Cl.
*B41J 3/407* (2006.01)
*B41J 11/00* (2006.01)
*C09D 11/104* (2014.01)
*C09D 11/322* (2014.01)
*C09D 11/328* (2014.01)
*C09D 11/40* (2014.01)
*C09D 11/54* (2014.01)

(52) U.S. Cl.
CPC ......... *B41J 11/0015* (2013.01); *C09D 11/104* (2013.01); *C09D 11/322* (2013.01); *C09D 11/328* (2013.01); *C09D 11/40* (2013.01); *C09D 11/54* (2013.01); *B41J 2202/03* (2013.01)

(58) Field of Classification Search
CPC .... B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033

See application file for complete search history.

(56) References Cited

U.S. PATENT DOCUMENTS

| | | | |
|---|---|---|---|
| 2012/0044312 A1* | 2/2012 | Hirst | B41J 11/00 347/172 |
| 2015/0273867 A1 | 10/2015 | Ohnishi | |
| 2015/0337152 A1* | 11/2015 | Oguchi | C09D 11/328 106/31.47 |
| 2016/0208119 A1* | 7/2016 | Oguchi | C09D 11/328 |
| 2018/0094380 A1* | 4/2018 | Yagi | D06P 1/6493 |
| 2020/0109302 A1* | 4/2020 | Sasaki | B41J 2/2107 |
| 2021/0139727 A1* | 5/2021 | Akanuma | B41M 5/0047 |
| 2021/0284853 A1* | 9/2021 | Teranishi | C09D 11/328 |
| 2022/0135820 A1* | 5/2022 | Shimura | B41J 2/2107 347/100 |
| 2022/0203739 A1* | 6/2022 | Sato | B41M 7/0081 |

* cited by examiner

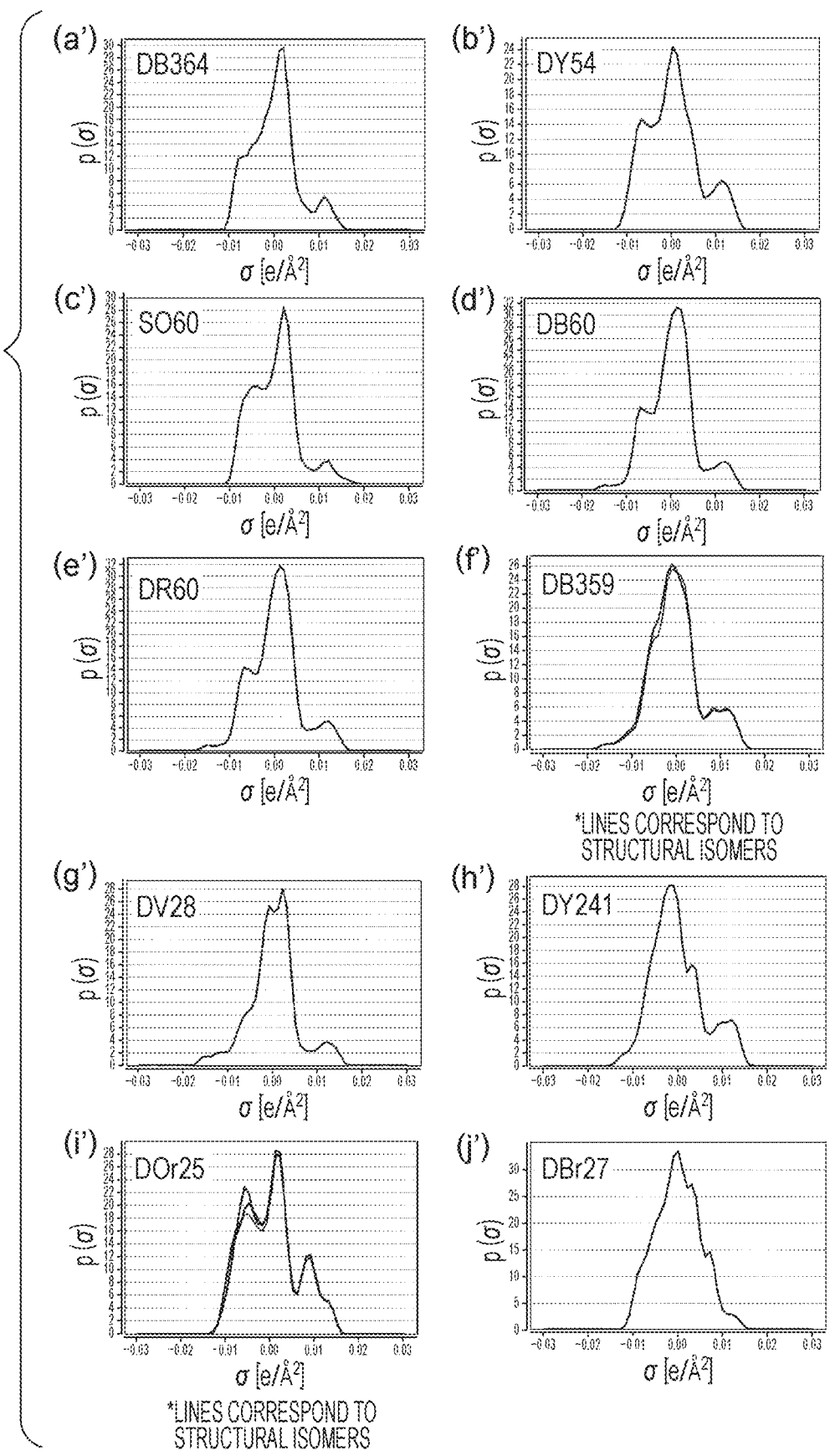

INK JET PRINTING METHOD AND INK JET PRINTING SET

The present application is based on, and claims priority from JP Application Serial Number 2022-173340, filed Oct. 28, 2022, the disclosure of which is hereby incorporated by reference herein in its entirety.

BACKGROUND

1. Technical Field

The present disclosure relates to an ink jet printing method and ink jet printing set.

2. Related Art

Since being able to record a highly fine image by a relatively simple apparatus, an ink jet recording method has been rapidly developed in various fields. Among the developments, various studies to more stably obtain a high quality recorded matter have been carried out. For example, in order to use a larger number of types of recording media and also to form a highly fine printed matter using a sublimation dye, JP-A-2014-083780 has disclosed a printing method including, for example, an ink application step of applying an ink on a recording medium. According to the patent document described above, the ink contains a solvent, a binder resin, and a sublimation dye, the binder resin is dispersed or emulsified in the solvent, the sublimation dye is contained in particles of the binder resin, and as the binder resin, a polyester-based resin is contained.

However, as disclosed in JP-A-2014-083780, even when an ink containing a polyester-based binder resin is used, discoloration may occur with time on a recorded matter in some cases.

SUMMARY

According to an aspect of the present disclosure, there is provided an ink jet printing method comprising: an ejection step of ejecting an ink jet ink composition containing a sublimation dye from a recording head so as to be adhered to an intermediate transfer medium A; and a transfer step of transferring the sublimation dye adhered to the intermediate transfer medium A by sublimation to a cloth B. In the ink jet printing method described above, when an affinity parameter Ln (gamma) at 25° C. between the sublimation dye and a member of a surface of the cloth B to which the sublimation transfer is performed is calculated by a COSMO-RS method, the affinity parameter Ln (gamma) at 25° C. is 5 or less.

According to another aspect of the present disclosure, there is provided an ink jet printing set comprising: an ink jet ink composition containing a sublimation dye; and a cloth B to which the sublimation dye is transferred by sublimation, and in the ink jet printing set described above, when an affinity parameter Ln (gamma) at 25° C. between the sublimation dye and a member of a surface of the cloth B to which the sublimation transfer is performed is calculated by a COSMO-RS method, the affinity parameter Ln (gamma) at 25° C. is 5 or less.

BRIEF DESCRIPTION OF THE DRAWINGS

FIG. 3 shows some calculation results used for the printing method of this embodiment.

DESCRIPTION OF EMBODIMENTS

Figure 1:
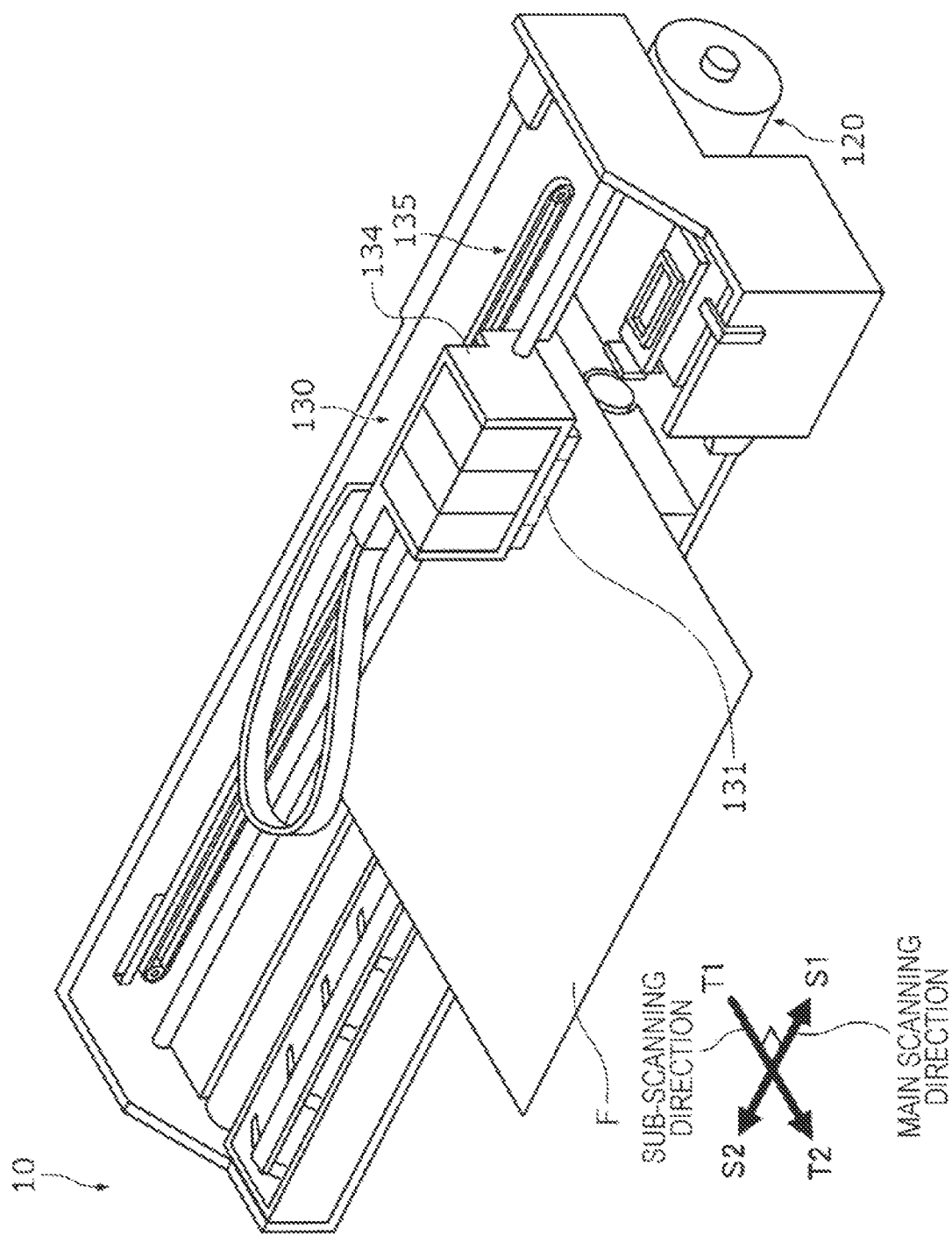
FIG. 1 is a view showing one example of a recording apparatus used for a printing method of this embodiment.

Hereinafter, if needed, with reference to the drawings, although an embodiment (hereinafter, referred to as "this embodiment") of the present disclosure will be described in detail, the present disclosure is not limited thereto and may be variously changed and/or modified without departing from the scope of the present disclosure. In addition, in the drawings, the same elements are designated by the same reference numerals, and duplicated description will be omitted. In addition, unless otherwise particularly noted, the positional relationship, such as top to bottom and right to left, are based on the positional relationship shown in the drawing. Furthermore, the dimensional ratio shown in the drawing is not limited to that shown therein.

1. Ink Jet Printing Method

An ink jet printing method (hereinafter, also simply referred to as "this printing method" in some cases) according to this embodiment includes an ejection step of ejecting an ink jet ink composition containing a sublimation dye from a recording head so as to be adhered to an intermediate transfer medium A; and a transfer step of transferring the sublimation dye adhered to the intermediate transfer medium A by sublimation to a cloth B, and in the ink printing method described above, when an affinity parameter Ln (gamma) at 25° C. between the sublimation dye and a member of a surface of the cloth B to which the sublimation transfer is performed is calculated by a COSMO-RS method, the affinity parameter Ln (gamma) at 25° C. is 5 or less.

In general, although being likely to dye polyester-based fibers, a dye ink composition containing a sublimation dye is liable to be inferior in dyeing property to a cotton cloth. As described above, the combination between an ink composition and a member of a recording surface has a significant influence on the characteristics of a printed matter. Hence, in order to obtain a printed matter having desired physical properties, a trial to impart a dyeing property to cotton by performing a pre-treatment on a cotton cloth has been carried out. However, even when the dyeing property can be imparted by the method as described above, it has been difficult to prevent a recorded matter from color change and color fading (hereinafter, collectively referred to as "discoloration" in some cases) with time.

Through intensive research carried out by the present inventors, it was found that when the affinity parameter Ln (gamma) at 25° C. calculated by a COSMO-RS method between the sublimation dye and the member of the surface of the cloth B to which the sublimation transfer is performed is decreased, the discoloration of a printed matter to be obtained is suppressed. Although the reason for this has not been clearly understood, it is presumed that as the affinity parameter Ln (gamma) is decreased, the affinity between the dye and the member of the recording surface is increased, and by this improvement in affinity, the discoloration is suppressed. However, the reason is not limited thereto.

Hereinafter, the affinity parameter Ln (gamma), the ejection step, the transfer step, the ink jet ink composition, the transfer medium, the ink jet printing set, and the like according to this embodiment will be described in detail.

In this printing method, after an ink composition containing a disperse dye, such as a sublimation dye, is ejected from a liquid spray head functioning as a recording head and is then adhered to an intermediate transfer medium A, while a surface of the intermediate transfer medium A to which the ink composition is adhered is placed to face a cloth surface to which a treatment liquid composition is adhered, heating is performed, so that the disperse dye contained in the ink composition is transferred to the cloth to which the treatment liquid composition is adhered. The printing method as described above is also called an indirect printing recording method. By the printing method as described above, preferable printing can be performed regardless of the type of cloth.

1.1. Affinity Parameter Ln (Gamma)

In this printing method, the affinity parameter Ln (gamma) at 25° C. calculated by a COSMO-RS method between the sublimation dye and the member of the surface of the cloth B to which the sublimation transfer is performed is 5 or less. When the sublimation dye and the cloth B are used together so as to satisfy that the affinity parameter Ln (gamma) between the sublimation dye and the member of the surface of the cloth B to which the sublimation transfer is performed is 5 or less, a printed matter which further suppresses the discoloration can be obtained. From a view similar to that described above, the affinity parameter Ln (gamma) described above is more preferably 3 or less and further preferably 0 or less. In addition, although being not particularly limited, a lower limit of the Ln (gamma) may be −3 or more or may also be −1 or more.

The affinity parameter Ln (gamma) represents a natural logarithm of activity coefficient γ. In this embodiment, as a first step to obtain the Ln (gamma), by quantum chemical calculation based on the density functional theory, a screening charge σ on a molecular surface is obtained. Next, from a σ-profile, $p^x(\sigma)$, which is the frequency distribution function of the screening charge σ, the activity coefficient γ of a molecule X is calculated based on the statistical mechanics by a COSMO-RS method, so that the Ln (gamma) is obtained. Although the software used for each step is not particularly limited, in the first step, TURBOMOLE (manufactured by COSMOlogic) is preferable, and in the following step, COSMOtherm (manufactured by COSMOlogic) is preferable. As long as the Ln (gamma) at 25° C. is calculated using a COSMO-RS method, the detailed calculation method of each step is not particularly limited, and for example, the calculation may be performed as described in "6. CALCULATION OF AFFINITY PARAMETER Ln (GAMMA)" which will be described later.

The affinity parameter Ln (gamma) can be adjusted by the type of fiber of the cloth, a pre-treatment step which will be described later, and/or the type of sublimation dye.

1.2. Ejection Step

In the ejection step of this printing method, the ink jet ink composition containing the sublimation dye is ejected from the recording head and is then adhered to the intermediate transfer medium A. In more particular, by driving a pressure generation device, the ink composition filled in a pressure generation chamber of the recording head is ejected from a nozzle.

In this step, at least two types of ink compositions may also be used. Accordingly, for example, a color gamut to be displayed can be further expanded. In order to more effectively and reliably obtain the effect of the present disclosure, when at least two types of ink compositions are used, the Ln (gamma) with respect to the dye of each ink composition is preferably 5 or less, more preferably 3 or less, and further preferably 0 or less.

1.3. Pre-Treatment Step

This printing method may further include, before the transfer step, a pre-treatment step of adhering a pre-treatment liquid composition in advance on the surface of the cloth B to which the sublimation transfer is performed. Since the pre-treatment step is performed, the discoloration of a printed matter can be further suppressed, and the abrasion resistance tends to be improved. In the pre-treatment step, as a method to adhere the pre-treatment liquid composition to the cloth, the pre-treatment liquid composition may be sprayed and adhered to the cloth using a spray or may be adhered thereto by an ink jet method.

When the ink composition is adhered to the intermediate transfer medium A by an ink jet recording apparatus, or when the pre-treatment liquid composition is adhered to the cloth B thereby, the ink jet recording apparatus to be used is not particularly limited, and either a serial type or a line type recording apparatus may be used. As one example of the ink jet recording apparatus, FIG. 1 shows a perspective view of a serial type recording apparatus. As shown in FIG. 1, a serial type recording apparatus 10 includes a transport portion 120 and a recording portion 130. The transport portion 120 transports a recording medium F supplied to the serial type recording apparatus to the recording portion 130 and then discharges the recording medium on which recording is performed out of the serial type recording apparatus. In particular, the transport portion 120 has feed rollers and transports the recording medium F thus supplied in a sub-scanning direction T1.

In addition, the recording portion 130 in the recording apparatus includes a carriage 134 mounting an ink jet head 131 having a nozzle to eject an ink composition to the recording medium F transported from the transport portion 120 and a carriage transfer mechanism 135 to transfer the carriage 134 in main scanning directions S1 and S2. In the case described above, the recording medium F may be either the intermediate transfer medium A or the cloth B.

In addition, the recording portion 130 in the recording apparatus includes nozzles to eject the ink composition or the pre-treatment liquid composition.

In the case of the serial type recording apparatus, as the ink jet head 131, a head having a length smaller than the width of the recording medium is provided, and since the head is transferred, the recording is performed by multi-pass operation. In addition, in the serial type recording apparatus, since the head 131 is mounted on the carriage 134 to be transferred in a predetermined direction and is transferred when the carriage is transferred, the ink composition is ejected on the recording medium. Accordingly, the recording is performed by at least two passes (multi-pass operation). In addition, the pass is also called a main scanning. Between the passes, a sub-scanning to transport the recording medium is performed. That is, the main scanning and the sub-scanning are alternately performed.

1.3.1. Pre-Treatment Liquid Composition

Before the printing is performed using the dye ink composition, the pre-treatment liquid composition of this printing method is used so as to be adhered to the surface of the medium on which the recording is performed. On the surface of the recording medium on which the pre-treatment is performed by the pre-treatment liquid composition, the discoloration of a printed matter to be obtained tends to be further suppressed. The pre-treatment liquid composition contains a resin, and if needed, also contains a cross-linking agent, water, and/or other components.

1.3.1.1. Resin

The pre-treatment liquid composition of this printing method contains a resin. The resin may also be a resin emulsion. Although the resin is not particularly limited, for example, a polyester resin, a polyurethane resin, or an acrylic resin may be mentioned. In order to more effectively and reliably obtain the effect of the present disclosure, as the resin, a resin having a constituent unit derived from a polyvalent carboxylic acid and a constituent unit derived from a polyvalent alcohol is preferable, a resin having a constituent unit derived from a dicarboxylic acid compound and a constituent unit derived from a diol compound is more preferable, and a polyester resin is preferable.

As the polyvalent carboxylic acid, for example, there may be mentioned terephthalic acid, isophthalic acid, orthophthalic acid, phthalic acid, 4,4'-diphenyldicarboxylic acid, 2,5-naphathalenedicarboxylic acid, 1,5-naphathalenedicarboxylic acid, 2,6-naphathalenedicarboxylic acid, 2,7-naphathalenedicarboxylic acid, 1,4-cyclohexanedicarboxylic acid, potassium 2-sulfoterephtalate, sodium 5-sulfoisophtalate, adipic acid, azelaic acid, sebacic acid, dodecanedicarboxylic acid, glutaric acid, succinic acid, trimellitic acid, trimesic acid, pyromellitic acid, trimellitic anhydride, phthalic anhydride, succinic anhydride, p-hydroxybenzoic acid, or a salt of at least one of those mentioned above. As the salt, for example, a potassium salt, a sodium salt, a calcium salt, or a magnesium salt may be mentioned. Among those mentioned above, in order to more effectively and reliably obtain the effect of the present disclosure, as the polyvalent carboxylic acid, terephthalic acid or isophthalic acid is preferably contained.

As the polyvalent alcohol, for example, there may be mentioned ethylene glycol, 1,2-propylene glycol, 1,3-propylene glycol, 1,3-propanediol, 1,3-butylene glycol, 1,4-butanediol, 1,6-hexanediol, 2-methyl-1,5-pentanediol, neopentyl glycol, 1,4-cyclohexanedimethanol, p-xylylene glycol, a bisphenol A-ethylene glycol adduct, diethylene glycol, triethylene glycol, a polyethylene glycol, a polypropylene glycol, a polytetramethylene glycol, a polytetramethylene oxide glycol, dimethylol propionic acid, glycerin, trimethylol propane, sodium dimethylolethylsulfonate, potassium dimethylolethylsulfonate, or potassium dimethylolpropionate. Among those mentioned above, in order to more effectively and reliably obtain the effect of the present disclosure, as the polyvalent alcohol, ethylene glycol or neopentyl glycol is preferably contained.

Among those mentioned above, a resin containing terephthalic acid and isophthalic acid as the dicarboxylic acid compound and ethylene glycol as the diol compound is preferable, and in addition, a content of the ethylene glycol with respect to a total mass of the diol compound is preferably 30 to 100 percent by mole. By the composition as described above, the discoloration of a printed matter to be obtained tends to be further suppressed. From a view similar to that described above, the content of the ethylene glycol with respect to the total mass of the diol compound is more preferably 40 to 100 percent by mole and further preferably 50 to 100 percent by mole.

In addition, a resin containing terephthalic acid and isophthalic acid as the dicarboxylic acid compound and ethylene glycol and neopentyl glycol as the diol compound is preferable, and in addition, a content of the ethylene glycol with respect to the total mass of the diol compound is preferably 30 to 100 percent by mole, and a content of the neopentyl glycol with respect to the total mass of the diol compound is preferably more than 0 to 70 percent by mole. By the composition as described above, the discoloration of a printed matter to be obtained tends to be further suppressed.

The polyester resin preferably includes a hydroxy group, a carboxy group, a sulfonic acid group, and a sodium salt of at least one of those mentioned above. Since including those groups, the polyester resin is able to preferably react with a cross-linking agent, and the adhesion to the cloth tends to be improved. Hence, a printed matter having a more sufficient discoloration suppression and a fastness can be obtained. In addition, at least one of the groups mentioned above may be included in the polyester resin.

Although a content of the resin is not particularly limited, the content with respect to a total mass of the pre-treatment liquid composition is preferably 0.5 to 10 percent by mass, more preferably 1.0 to 8.0 percent by mass, and further preferably 2.0 to 7.0 percent by mass. Since the content of the resin is in the range described above, the effect of the present disclosure can be more effectively and reliably obtained.

In addition, from a view similar to that described above, a content of the polyester resin with respect to the total mass of the pre-treatment liquid composition is preferably 0.5 to 10 percent by mass, more preferably 1.0 to 8.0 percent by mass, and further preferably 2.0 to 7.0 percent by mass.

1.3.1.2. Cross-Linking Agent

The pre-treatment liquid composition preferably further contains a cross-linking agent. Since the cross-linking agent is contained, a cross-linking property can be imparted, and the adhesion among the resin, the dye, and the cloth tends to be improved.

The cross-linking agent may be used after being appropriately selected from known cross-linking agents, and for example, a cross-linking agent to start a cross-linking reaction at ordinary temperature or a cross-linking agent to start a cross-linking reaction by heating may be used. As the cross-linking agent described above, for example, there may be mentioned a cross-linking agent having a self-cross-linking property, a compound having at least two functional groups in its molecule to react with an unsaturated carboxylic acid component, or a metal having a polyvalent coordination site.

In more particular, as the cross-linking agent, a compound, such as a polyisocyanate-based compound or a polyepoxy-based compound, having a functional group to react with a hydroxy group and/or a carboxy group included in a polyester-based resin may be mentioned.

Although the polyisocyanate-based compound is not particularly limited, for example, there may be mentioned a polyisocyanate, such as tetramethylene diisocyanate, hexamethylene diisocyanate, isophorone diisocyanate, tolylene diisocyanate, diphenylmethane diisocyanate, a hydrogenated diphenylene diisocyanate, xylylene diisocyanate, a hydrogenated xylylene diisocyanate, tetramethylxylylene diisocyanate, 1,5-naphthalene diisocyanate, or triphenylmethane triisocyanate, and in addition, for example, an adduct between one of the polyisocyanates mentioned above and a polyol compound, such as trimethylolpropane, a biuret of one of the polyisocyanates mentioned above, or an isocyanurate thereof may also be mentioned.

In order to more effectively and reliably obtain the effect of the present disclosure, a content of the cross-linking agent with respect to the total mass of the pre-treatment liquid composition on a solid content basis is preferably 0.1 to 10 percent by mass, more preferably 0.5 to 5.0 percent by mass, and further preferably 1.0 to 3.0 percent by mass.

In addition, from a view similar to that described above, a mass ratio of the resin with respect to the cross-linking agent (resin: cross-linking agent) is preferably 1:1.2 to 1:0.01 and more preferably 1:0.70 to 1:0.05.

1.3.1.3. Water

The pre-treatment liquid composition may also contain water. As the water, for example, there may be mentioned pure water, such as ion exchange water, ultrafiltration water, reverse osmosis water, or distilled water, or ultrapure water.

A content of the water in the pre-treatment liquid composition of this embodiment with respect to the total mass thereof is preferably 70 to 99 percent by mass, more preferably 80 to 98 percent by mass, and further preferably 90 to 97 percent by mass.

1.3.1.4. Other Components

The pre-treatment liquid composition may also contain various types of additives, such as a surfactant, a solubilizing agent, a viscosity adjuster, a pH adjuster, an antioxidant, an antiseptic agent, a fungicide, a corrosion inhibitor, and/or a chelating agent. Contents of the additives with respect to the total mass of the pre-treatment liquid composition are each, for example, approximately 0.01 to 5.0 percent by mass. In addition, the additives may be used alone, or at least two types thereof may be used in combination.

1.4. Pre-Drying Step

This printing method may also include a pre-drying step. The pre-drying step is a step of drying the pre-treatment liquid composition by heating the cloth B to which the pre-treatment liquid composition is adhered or by sending wind thereto. As a heating unit to heat the cloth B is not particularly limited, and for example, a unit, such as a platen heater, a hot wind heater, or an IR heater, having a heating function or a unit such as a blower having no heating function may be mentioned.

A drying temperature in the pre-drying step is preferably 80° C. to 150° C., more preferably 90° C. to 140° C., and further preferably 100° C. to 130° C. In addition, the drying temperature indicates an average temperature in a region of a cloth surface in which the recording is performed. In addition, a drying time is preferably 30 seconds to 10 minutes, more preferably 40 seconds to 5.0 minutes, and further preferably 50 seconds to 3.0 minutes.

1.5. Transfer Step

In the transfer step of this printing method, the sublimation dye adhered to the intermediate transfer medium A is transferred to the cloth B by sublimation. In more particular, the transfer step is a step in which while the surface of the intermediate transfer medium A to which the sublimation dye is adhered is placed to face the recording surface of the cloth B, the sublimation dye adhered to the intermediate transfer medium A is transferred to the cloth B by heating. Accordingly, the sublimation dye is transferred, and hence, a printed matter which is the cloth B to which the sublimation dye is adhered can be obtained.

In this step, the heating is preferably performed while the surface of the intermediate transfer medium A to which the ink composition is adhered is tightly in contact with the recording surface of the cloth B. As a result, an image of a printed matter to be obtained tends to be made clearer.

As a heating method, for example, a vapor steaming treatment, a heat press with dry heat, a thermosol treatment, an HT steamer with superheated vapor, or an HP steamer with a pressurized vapor may be mentioned. A heat treatment may be immediately performed on the cloth B to which the sublimation dye is adhered or may be performed after a predetermined time passes. In order to obtain a clearer printed matter, as the heating method, dry heating is preferably performed.

In order to more effectively and reliably obtain the effect of the present disclosure, a heating temperature is preferably 160° C. to 220° C. and more preferably 180° C. to 200° C. In addition, since the heating temperature is set as described above, energy required for the transfer can be reduced, and the productivity of printed matters tends to be made superior.

In order to more effectively and reliably obtain the effect of the present disclosure, although depending on the heating temperature, a heating time is preferably 30 to 120 seconds and more preferably 40 to 90 seconds. In addition, since the heating time is set as described above, energy required for the transfer can be reduced, and the productivity of printed matters tends to be made superior.

1.6. Recording Medium

In this printing method, the intermediate transfer medium A to which the ink composition ejected from the recording head is adhered and the cloth B to which the sublimation dye adhered to the intermediate transfer medium A is transferred by sublimation are used as the recording media.

1.6.1. Intermediate Transfer Medium A

As the intermediate transfer medium A, for example, paper, such as regular paper, or a recording medium including an ink receiving layer may be used. The recording medium including an ink receiving layer is called, for example, ink jet exclusive paper, coated paper, or the like. Among those mentioned above, paper including an ink receiving layer which contains inorganic particles, such as silica, is more preferable. Accordingly, in a process in which the ink composition adhered to the intermediate transfer medium A is dried, an intermediate recorded matter having a recording surface in which bleeding or the like is suppressed can be obtained. In addition, when the medium as described above is used, a disperse dye is more likely to stay on the recording surface, and in the following transfer step, the sublimation of the disperse dye can be more efficiently performed.

1.6.2. Cloth B

When the affinity parameter Ln (gamma) at 25° C. calculated by a COSMO-RS method between the sublimation dye and the member of the surface of the cloth B to which the sublimation transfer is performed is 5 or less, the cloth B of this printing method is not particularly limited. Although fibers forming the cloth B are not particularly limited, for example, natural fibers, such as cotton or wool fibers, synthetic fibers, such as polyester fibers, or non-woven cloths may be mentioned. Among those mentioned above, in order to further suppress the discoloration of a printed matter to be obtained, as the member described above, at least one selected from the group consisting of a cotton cloth, a polypropylene non-woven cloth, and a blended cloth between a cotton and a polyester is preferable, and at least one selected from the group consisting of a cotton cloth and a polypropylene non-woven cloth is more preferable.

The blended cloth between a cotton and a polyester has a polyester ratio of preferably more than 0% to 50% and more preferably more than 0% to 45%.

In addition, when the cloth B contains poly(ethylene terephthalate) fibers, a content thereof with respect to a total mass of the cloth B is preferably more than 0 to 5 percent by mass. According to the composition as described above, the discoloration of a printed matter to be obtained tends to be further suppressed.

1.7. Ink Jet Ink Composition

The ink jet ink composition (hereinafter, simply referred to as "ink composition" in some cases) of this embodiment contains a sublimation dye and, if needed, also contains components to be used for an ink composition. Hereinafter, the components to be contained in the ink composition of this embodiment will be described in detail.

1.7.1. Sublimation Dye

The ink composition contains a sublimation dye and, if needed, may also contain at least one colorant, such as other dyes and/or pigments. In this specification, the "sublimation dye" indicates a dye to be sublimated by heating. The colorant may be used alone, or at least two types thereof may be used in combination.

The ink composition preferably contains at least two types of sublimation dyes, and the Ln's (gamma) with respect to the respective sublimation dyes are each preferably 5 or less. When the composition and the method as described above are used, the discoloration of a printed matter to be obtained tends to be further suppressed. From a view similar to that described above, the ink composition more preferably contains at least two types of sublimation dyes, and the Ln's (gamma) with respect to the respective sublimation dyes are each more preferably 3 or less and further preferably 0 or less.

The sublimation dye is not particularly limited, and for example, there may be mentioned Disperse Yellow 3, 7, 8, 23, 39, 51, 54, 60, 71, 86, or 232; Disperse Orange 1, 1:1, 5, 20, 25, 33, 56, 60, or 76; Disperse Brown 2 or 27; Disperse Red 11, 50, 53, 55, 55:1, 59, 60, 65, 70, 75, 93, 146, 158, 190, 190:1, 207, 239, 240, or 364; Disperse Violet 8, 17, 23, 27, 28, 29, 36, or 57; or Disperse Blue 14, 19, 26, 26:1, 35, 55, 56, 58, 64, 64:1, 72, 72:1, 81, 81:1, 91, 95, 108, 131, 141, 145, 359, or 360.

Among the sublimation dyes mentioned above, in order to more effectively and reliably obtain the effect of the present disclosure, at least one selected from the group consisting of Disperse Orange 25, Disperse Blue 360, Disperse Blue 359, Disperse Yellow 54, Disperse Yellow 232, Solvent Orange 60, Disperse Violet 28, Disperse Red 60, and Disperse Brown 27 is preferably contained.

Although a content of the sublimation dye is not particularly limited, the content thereof with respect to a total mass of the ink composition is preferably 1 to 30 percent by mass, more preferably 2 to 25 percent by mass, even more preferably 3 to 20 percent by mass, and further preferably 5 to 10 percent by mass. Since the content of the sublimation dye is in the range described above, the discoloration of a printed matter to be obtained tends to be further suppressed.

1.7.2. Dispersant

The ink composition may also contain a dispersant. When the ink composition contains a dispersant, the dispersibility of the dye is improved, and a clogging reliability of the ink composition tends to be made superior. The dispersant may be used alone, or at least two types thereof may be used in combination.

Although the dispersant is not particularly limited, for example, a sodium naphthalenesulfonate formalin condensate or a resin may be mentioned. In order to more effectively and reliably obtain the effect of the present disclosure, a sodium naphthalenesulfonate formalin condensate is preferably contained.

The sodium naphthalenesulfonate formalin condensate is one type of anionic-based dispersant and is a formalin condensate of an aromatic sulfonic acid. Since the dispersant as described above is used, for example, the dispersion stability and the ejection stability tend to be improved.

Although a nonionic-based dispersant is not particularly limited, for example, an ethylene oxide adduct of phytosterol or an ethylene oxide adduct of cholestanol may be mentioned.

In addition, although a high molecular weight dispersant is not particularly limited, for example, there may be mentioned a polyacrylic acid partial alkyl ester, a polyalkylene polyamine, a polyacrylic acid salt, a styrene-acrylic acid copolymer, or a vinylnaphthalene-maleic acid copolymer.

Although a content of the dispersant is not particularly limited, the content described above with respect to the total mass of the ink composition is preferably 1.0 to 30 percent by mass, more preferably 3.0 to 20 percent by mass, and further preferably 5.0 to 10 percent by mass. Since the content of the dispersant is set in the range described above, the storage stability and the ejection stability of the composition tend to be improved.

1.7.3. Water-Soluble Organic Solvent

The ink composition may also contain a water-soluble organic solvent. Although the water-soluble organic solvent is not particularly limited, for example, there may be mentioned glycerin; a glycol, such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, or 1,6-hexanediol; a glycol monoether, such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, or triethylene glycol monobutyl ether; a lactam compound, such as 2-pyrrolidone, N-methyl-2-pyrrolidone, N-ethyl-2-pyrrolidone, or N-hydroxyethyl pyrrolidone (HEP); or an alcohol, such as methanol, ethanol, n-propyl alcohol, iso-propyl alcohol, n-butanol, 2-butanol, tert-butanol, iso-butanol, n-pentanol, 2-pentanol, 3-pentanol, or tert-pentanol. In addition, the water-soluble organic solvent may be used alone, or at least two types thereof may be used in combination.

Among the compounds mentioned above, as the water-soluble organic solvent, at least one selected from the group consisting of glycerin, propylene glycol, and triethylene glycol is preferably contained, at least two selected from the group described above are more preferably contained, and glycerin, propylene glycol, and triethylene glycol are further preferably contained. As the water-soluble organic solvent, when at least one of the compounds described above is used, the effect of the present disclosure can be more effectively and reliably obtained.

Although a total content of the water-soluble organic solvents is not particularly limited, the content described above with respect to the total mass of the ink composition is preferably 5 to 50 percent by mass, more preferably 10 to 40 percent by mass, and further preferably 15 to 30 percent by mass. Since the total content of the water-soluble organic solvents is in the range described above, the effect of the present disclosure can be more effectively and reliably obtained.

1.7.4. Water

The ink composition contains water. As the water, for example, there may be mentioned pure water, such as ion exchange water, ultrafiltration water, reverse osmosis water, or distilled water, or ultrapure water.

In order to more effectively and reliably obtain the effect of the present disclosure, a content of the water with respect to the total mass of the ink composition is preferably 30 to 95 percent by mass, more preferably 40 to 90 percent by mass, even more preferably 50 to 80 percent by mass, and further preferably 55 to 75 percent by mass.

1.7.5. Surfactant

The ink composition may also contain a surfactant. Although the surfactant is not particularly limited, for example, a silicone-based surfactant, an acetylene glycol-based surfactant, or a fluorine-based surfactant may be mentioned. In order to more effectively and reliably obtain the effect of the present disclosure, as the surfactant, a silicone-based surfactant is preferably used. The surfactant may be used alone, or at least two types thereof may be used in combination.

As the silicone-based surfactant, for example, a polysiloxane-based compound may be mentioned. Although the polysiloxane-based compound is not particularly limited, for example, a polyether-modified organosiloxane may be mentioned. As a commercial product of the polyether-modified organosiloxane, for example, there may be mentioned BYK-306, BYK-307, BYK-333, BYK-341, BYK-345, BYK-346, or BYK-348 (trade name, manufactured by BYK Japan KK), or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.). Among those mentioned above, in order to more effectively and reliably obtain the effect of the present disclosure, BYK-348 is preferably used.

The acetylene glycol-based surfactant is not particularly limited, and for example, at least one selected from the group consisting of 2,4,7,9-tetramethyl-5-decyne-4,7-diol, an alkylene oxide adduct thereof, 2,4-dimethyl-5-decyne-4-ol, and an alkylene oxide adduct thereof may be mentioned.

The fluorine-based surfactant is not particularly limited, and for example, there may be mentioned a perfluoroalkyl sulfonate, a perfluoroalkyl carboxylate, a perfluoroalkyl phosphoric acid ester, a perfluoroalkyl ethylene oxide adduct, a perfluoroalkyl betaine, or a perfluoroalkylamine oxide compound.

A content of the surfactant with respect to the total mass of the ink composition is preferably 0.1 to 3.0 percent by mass, more preferably 0.2 to 2.0 percent by mass, and further preferably 0.3 to 1.0 percent by mass. Since the content of the surfactant is in the range described above, the effect of the present disclosure can be more effectively and reliably obtained.

2. Ink Jet Printing Set

An ink jet printing set (hereinafter, simply referred to as "printing set" in some cases) of this embodiment is a set including an ink jet ink composition containing a sublimation dye and a cloth B to which the sublimation dye is transferred by sublimation, and an affinity parameter Ln (gamma) at 25° C. calculated by a COSMO-RS method between the sublimation dye and a member of a surface of the cloth B to which the sublimation transfer is performed is 5 or less. Since the printing set satisfies the conditions described above, the discoloration of a printed matter to be obtained is further suppressed, and the texture thereof is also made excellent. From a view similar to that described above, in the printing set, the affinity parameter Ln (gamma) at 25° C. of the printing set is preferably 3 or less and more preferably 0 or less.

In addition, when the printing set is an ink jet printing set including an ink jet ink composition containing a sublimation dye and a pre-treatment liquid composition, the pre-treatment liquid composition is a composition to perform a pre-treatment on a cloth B to which the sublimation dye is transferred by sublimation, the pre-treatment liquid composition contains resin particles, and an affinity parameter Ln (gamma) at 25° C. calculated by a COSMO-RS method between the sublimation dye and the resin particles is 5 or less, the discoloration of a printed matter to be obtained is further suppressed, and in addition, the texture thereof tends to be made more excellent.

Examples

Hereinafter, the present disclosure will be described in more detail with reference to Examples and Comparative Examples. The present disclosure is not at all limited to the following Examples.

1. Synthesis of Resin 1.1. Synthesis of Polyester Resin

A mixture containing a dicarboxylic acid and an alkylene glycol was prepared to form one of the compositions shown in Table 1. This mixture was charged in an autoclave, and an esterification reaction was performed at 220° C. for 4 hours. Next, after tetrabutyl titanate was added in the autoclave as a catalyst, and the temperature was then increased to 230° C., the pressure was gradually decreased to 13 Pa over 1.5 hours. Under the same conditions as described above, after a polycondensation reaction was continued for 4 hours, a nitrogen gas was introduced in the autoclave so that the pressure therein was returned to normal pressure, and the temperature was decreased to room temperature, so that polyester resins PET-1, PES-1, and PES-2 were each synthesized. In addition, the amount of each component shown in Table 1 is represented by percent by mole.

1.2. Synthesis of Polypropylene Resin

Raw materials, that is, a polypropylene resin and water (dispersant), were charged in a solid/liquid stirring machine (or an emulsification machine) and were then mixed and stirred at a temperature of 40° C. or less. Subsequently, while the temperature in a bath of the machine was maintained at 100° C. to 190° C., until coarse particles disappeared, the stirring was continued for 300 minutes.

TABLE 1

|  |  | PET-1 | PES-1 | PES-2 | PP-1 |
|---|---|---|---|---|---|
| RESIN MONOMER | TEREPHTHALIC ACID | 50 | 25 | 25 | — |
|  | ISOPHTHALIC ACID | — | 25 | 25 | — |
|  | ETHYLENE GLYCOL | 50 | 8.3 | 25 | — |
|  | NEOPENTYL GLYCOL | — | 41.7 | 25 | — |
|  | PROPYLENE | — | — | — | 100 |
|  | TOTAL | 100 | 100 | 100 | 100 |

*NUMERICAL VALUE IN TABLE REPRESENTS PERCENT BY MOLE.

2. Preparation of Pre-Treatment Liquid Composition

After the components were charged in a mixing tank to form one of the compositions shown in Table 2 and were then mixed and stirred, filtration was performed using a membrane filter having a pore diameter of 5 μm, so that pre-treatment liquid compositions were each obtained. In addition, the numerical value of the amount of each component in Table 2 represents percent by mass. The amount of a cross-linking agent represents an amount (percent by mass) calculated on a solid content basis.

The details of the components shown in the table are as described below.

Resin Dispersion Liquid
  PET-1 (synthetic polyester resin)
  PES-1 (synthetic polyester resin)
  PES-2 (synthetic polyester resin)
  PP-1 (synthetic polypropylene resin)
Cross-Linking Agent
  hexamethylenediisocyanate (trade name: "Fixer #220", isocyanate group-containing compound, solid content: 40 percent by mass, manufactured by Murayama Chemical Laboratory Co., Ltd.)

TABLE 2

| NAME OF PRE-TREATMENT LIQUID COMPOSITION | | PT-1 | PT-2 | PT-3 | PT-4 | PT-5 |
|---|---|---|---|---|---|---|
| RESIN DISPERSION LIQUID | PET-1 | 5 | — | — | — | — |
| | PES-1 | — | 5 | — | — | — |
| | PES-2 | — | — | 5 | 5 | — |
| | PP-1 | — | — | — | — | 5 |
| CROSS-LINKING AGENT | HEXAMETHYLENE DIISOCYANATE | — | — | — | 0.2 | — |
| PURE WATER | | BALANCE | BALANCE | BALANCE | BALANCE | BALANCE |
| TOTAL | | 100 | 100 | 100 | 100 | 100 |

*NUMERICAL VALUE IN TABLE REPRESENTS PERCENT BY MOLE.

3. Preparation of Ink Jet Ink Composition

The components were charged in a mixing tank to form one of the compositions shown in Table 3 and were then mixed and stirred for 2 hours by a stirrer. Subsequently, filtration was performed using a membrane filter having a pore diameter of 1 μm, so that the ink jet ink composition of each Example was obtained.

The abbreviations and components used in the table are as shown below.

Dye
  DOr25 (Disperse Orange 25)
  DB360 (Disperse Blue 360)
  DY54 (Disperse Yellow 54)
  SO60 (Solvent Orange 60)
  DV28 (Disperse Violet 28)
  DR60 (Disperse Red 60)
  DB359 (Disperse Blue 359)
  DY232 (Disperse Yellow 232)
  DBr27 (Disperse Brown 27)
Dispersant
  naphthalenesulfonic acid formalin condensate (trade name "DEMOL (registered trademark) NL", manufactured by Kao Corporation)
Water-Soluble Organic Solvent
  propylene glycol
  glycerin
  methyl triglycol
Surfactant
  BYK 348 (trade name, silicone-based surfactant, manufactured by BYK Japan KK)

TABLE 3

| NAME OF INK | | Ink-1 | Ink-2 | Ink-3 | Ink-4 | Ink-5 | Ink-6 | Ink-7 |
|---|---|---|---|---|---|---|---|---|
| DYE | DOr25 | 2.5 | | | | | | |
| | DB360 | 1.5 | | | | | | |
| | DY54 | 0.5 | 3 | | | 6 | | |
| | SO60 | 1.5 | | | | | | |
| | DV28 | 0.5 | 1 | | | | 6 | |
| | DR60 | | 0.5 | 6 | | | | |
| | DB359 | | 4 | | | | | |
| | DY232 | | | | 6 | | | |
| | DBr27 | | | | | | | 6 |
| DISPERSANT | ACID NAPHTHALENE SULFONIC FORMALIN CONDENSATE | 7.3 | 8.5 | 7 | 7 | 7 | 7 | 7 |
| WATER-SOLUBLE ORGANIC SOLVENT | PROPYLENE GLYCOL | 5 | 5 | 5 | 5 | 5 | 5 | 5 |
| | GLYCERIN | 10 | 10 | 10 | 10 | 10 | 10 | 10 |
| | METHYL TRIGLYCOL | 5 | 5 | 5 | 5 | 5 | 5 | 5 |
| SURFACTANT | BYK348 | 0.5 | 0.5 | 0.5 | 0.5 | 0.5 | 0.5 | 0.5 |
| PURE WATER | | BALANCE | BALANCE | BALANCE | BALANCE | BALANCE | BALANCE | BALANCE |
| TOTAL | | 100 | 100 | 100 | 100 | 100 | 100 | 100 |

*NUMERICAL VALUE IN TABLE REPRESENTS PERCENT BY MOLE

4. Formation of Printed Matter
4.1. Pre-Treatment Step: Formation of Cloth B to which Pre-Treatment Liquid Composition is Adhered The pre-treatment liquid composition having the composition described in each Example was adhered to a cloth. In particular, as described below, a cloth to which the pre-treatment liquid composition was adhered was obtained.

A white cotton broadcloth #4000 (trade name, manufactured by Nisshinbo), a white polypropylene non-woven cloth SPLITOP SP (trade name, manufactured by Maeda Kosen Co., Ltd.), and a white blended cloth CP443044 containing 55% of a cotton and 45% of a polyester (trade name, manufactured by Akahori Sangyo Co., Ltd.) were each immersed in the pre-treatment liquid composition and then coated therewith by a mangle roller at a squeezing rate of 80%. Subsequently, drying was performed at 110° C. for 3 minutes, so that the cloths to each of which the pre-treatment liquid composition was adhered were obtained. In addition, the squeezing rate (S) was calculated by the following equation.

$$S(\%)=[(A-B)/B]\times 100$$

In addition, in the above equation, S represents the squeezing rate (%), A represents the mass of the cloth to which the pre-treatment liquid composition is adhered, and B represents the mass of the cloth before the pre-treatment liquid composition is adhered.

4.2. Ejection Step: Formation of Intermediate Transfer Medium a to which Ink Composition is Adhered The ink composition of each Example was filled in a cartridge of an ink jet printer PX-G930 (trade name, manufactured by Seiko Epson Corporation). Subsequently, to a surface of coated paper (trade name, "TRANSJET sportline 1254", manufactured by Cham Paper) used as the intermediate transfer medium at which a coating layer was provided, the ink composition was adhered under conditions in which the resolution was 720 dpix720 dpi and the ink ejection amount was 12 mg/inch$^2$ at an ink ejection duty of 100%, so that an image having a solid pattern was formed. Accordingly, the intermediate transfer medium to which the ink composition was adhered was obtained.

4.3. Transfer Step: Formation of Printed Matter Sublimation Transfer to Cotton and Blended Cloth Containing 55% of Cotton and 45% of Polyester While the surface of the intermediate transfer medium to which the ink composition obtained as described above was adhered and on which the image was formed and the surface of the cloth to which the pre-treatment liquid composition obtained as described above was adhered or to which the pre-treatment was not performed were placed to face each other, pressing was performed at a temperature of 200° C. and a pressure of 4.2 N/cm 3 for 60 seconds by a heat press machine (trade name "TP-608M", manufactured by Taiyo Seiki Co., Ltd.) to thermally transfer the sublimation dye on the intermediate transfer medium to the cloth, so that a printed matter, that is, the cloth to which the sublimation dye was adhered, of each Example was obtained.

Sublimation Transfer to Polypropylene Non-Woven Cloth

While the surface of the intermediate transfer medium to which the ink composition obtained as described above was adhered and on which the image was formed and the surface of the polypropylene non-woven cloth to which the pre-treatment liquid composition obtained as described above was adhered or to which the pre-treatment was not performed were placed to face each other, pressing was performed at a temperature of 140° C. and a pressure of 3 N/cm 3 for 40 seconds by the heat press machine described above to thermally transfer the sublimation dye on the intermediate transfer medium to the cloth, so that a printed matter, that is, the cloth to which the sublimation dye was adhered, of each Example was obtained.

5. Evaluation of Printed Matter
5.1. Discoloration

The printed matter thus obtained was left at a room temperature of 25° C. for one hour. Subsequently, using a fluorescence spectrodensitometer (trade name "FD-7", manufactured by Konica Minolta, Inc.), the color optical density (OD value) of the ink of the printed matter thus left of each Example was measured under the following conditions. Next, after the printed matter was left at a room temperature of 25° C. for three days, under conditions similar to those described above, the color optical density (OD value) of the printed matter thus left of each Example was measured.

Measurement Conditions
  room temperature: 25° C.
  observation light source: D65
  observation viewing field: 2°
  status: T
  polarizing filter: No The OD value of the printed matter immediately after the printing and the OD value of the printed matter which was left for three days were compared to each other, and in accordance with the following evaluation criteria, the degree of discoloration of the printed matter of each of Examples and Comparative Examples was evaluated.

Evaluation Criteria
  AAA: Rate of change in OD value is less than 1%.
  AA: Rate of change in OD value is 1% to less than 2%.
  A: Rate of change in OD value is 2% to less than 5%.
  B: Rate of change in OD value is 5% to less than 10%.
  C: Rate of change in OD value is 10% or more.

5.2. Texture

The texture of the printed matter thus obtained of each Example was evaluated by a sensory test. In particular, the printed matter thus obtained was touched by a judge for sensory evaluation, and the texture of the printed matter was evaluated in accordance with the following evaluation criteria. The results are shown in the table.

Evaluation Criteria
  AA: Printed matter is soft without stiff feeling.
  A: Printed matter is slightly hard with slightly stiff feeling.
  B: Printed matter is hard with remarkably stiff feeling.

6. Calculation of Affinity Parameter Ln (Gamma)
6.1. Quantum Chemistry Calculation A quantum chemistry calculation was performed using TURBOMOLE. As a functional representing the electron correlation, BP86 is used, and as a basis function, def2-TZVPD is used. BP86 is the generalized gradient approximation (GGA). A conductor-like screening model in which a molecule is embedded in a virtual external conductor is used. A space in which the molecule is embedded in the virtual external conductor is a region defined by the vander-Waals radius. A screening charge on a molecular surface formed by the external conductor is obtained for each molecular surface segment k and is represented by σk. The frequency distribution of σk of a molecule X is a σ-profile $p^x(\sigma)$.

Figure 2:
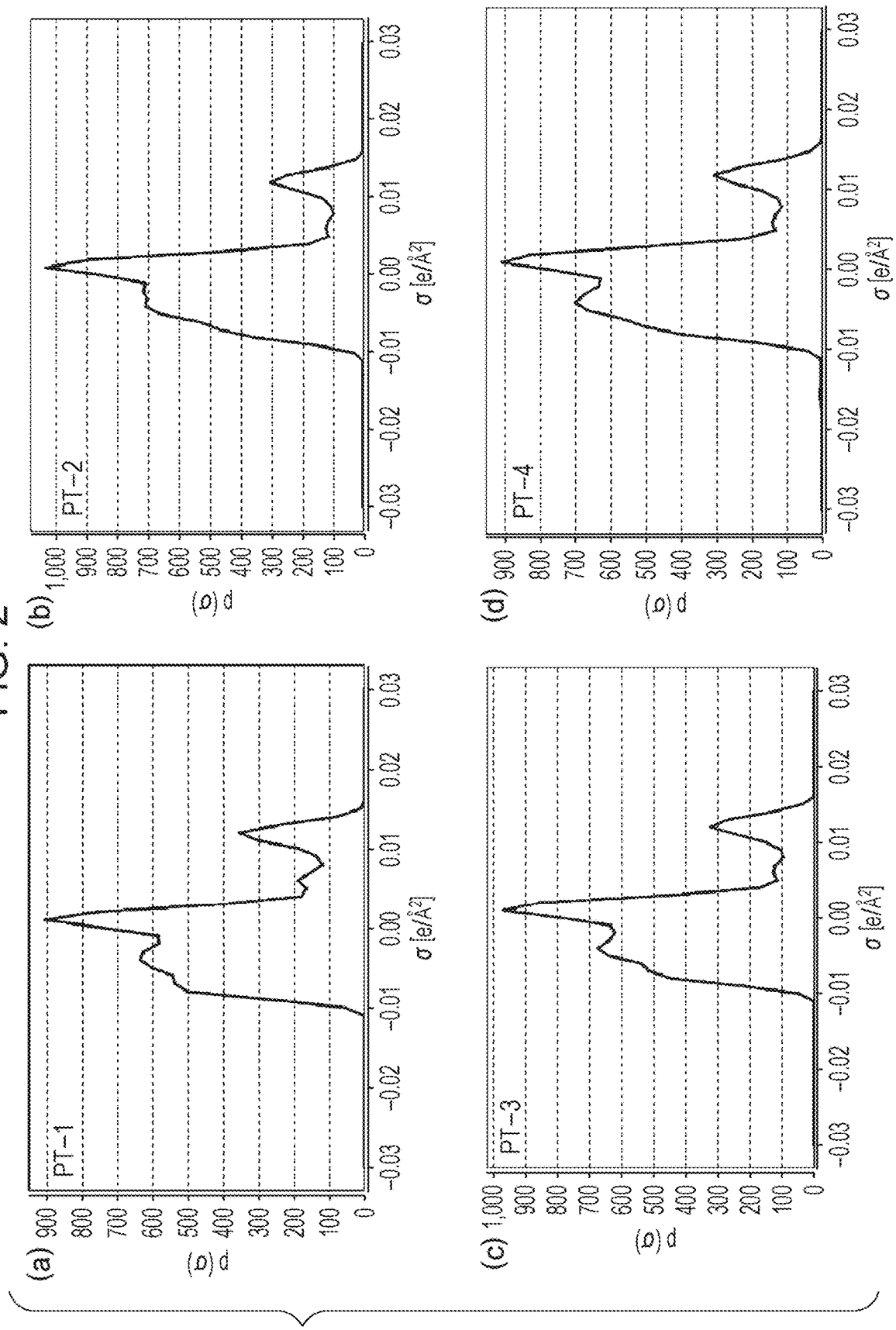
FIG. 2 shows some calculation results used for the printing method of this embodiment.

In addition, as for the $p^x(\sigma)$ used in this calculation, the profiles each obtained from the high molecular weight compound used for the pre-treatment liquid are shown in FIG. 2, and the profiles each obtained from the dye molecule are shown in FIG. 3.

6.2. Calculation by Cosmo-RS Method

A system S in which a colorant molecule is dissolved in a macromolecule is assumed. At a molecular surface at which the molecules are in contact with each other, with respect to the screening charge σ, three types of excess energy, $E_{misfit}$, $E_{HB}$, and $E_{vdW}$, are generated. Those are represented by (1), (2), and (3), respectively. $E_{misfit}$ is called misfit energy and represents the electrostatic energy. $E_{HB}$ is energy by a hydrogen bond, and $E_{vdW}$ corresponds to energy by a van-der-Waals dispersion force.

[Eq. 1]

$$E_{misfit}(\sigma, \sigma') = a_{eff} \frac{a'}{2}(\sigma + \sigma')^2 \quad (1)$$

$$E_{HB}(\sigma, \sigma') = \quad (2)$$
$$a_{eff}\, c_{RB}\, \min(0; \min(0; \sigma_{damar} + \sigma_{RB})\max(0; \sigma_{acceptor} + \sigma_{RB}))$$

$$E_{vdW}(\sigma, \sigma') = a_{eff}(\tau_{vdW} + \tau'_{vdW}) \quad (3)$$

The sum of $E_{misfit}$ and $E_{HB}$ each apparently including σ in the energy equation is represented by E(σ, σ').

[Eq. 2]

$$E(\sigma, \sigma') = \frac{1}{a_{eff}}\{E_{misfit}(\sigma, \sigma') + E_{RB}(\sigma, \sigma')\} \quad (4)$$

From a σ-profile $p^{Xi}$ and a molar ratio $x_i$ of each molecule Xi, the σ-profile $p_S(\sigma)$ of the system S is obtained.

[Eq. 3]

$$p_S(\sigma) = \Sigma_{i \in S}[x_i p^{Xi}(\sigma)] \quad (5)$$

From the $p_s(\sigma)$ and the energy E(σ, σ'), based on the statistical mechanics, the chemical potential $\mu_s(\sigma)$ indicating the affinity of the screening charge σ in the system S is represented by the following equation (6).

[Eq. 4]

$$\mu_S(\sigma) = -\frac{RT}{a_{eff}} \ln\left[\int p_S(\sigma') \exp\left\{\frac{a_{eff}}{RT}[\mu_S(\sigma') - E(\sigma, \sigma')]\right\} d\sigma'\right] \quad (6)$$

In Equation (6) which is the core of the COSMO-RS method, when the $\mu_s(\sigma)$ obtained by solving Equation (6) which is a self-consistent expression about the $\mu_s(\sigma)$ is multiplied by $p^{Xi}(\sigma)$ and is then integrated with respect to σ, a chemical potential $\mu_s^{Xi}$ of the molecule $X_i$ in the system S is obtained. In this case, a combinatorial term $\mu_{CS}^{Xi}$ representing the contribution to the entropy from the molecular form is added.

[Eq. 5]

$$\mu_S^{Xi} = \mu_{CS}^{Xi} + \int p^{Xi}(\sigma)\mu_S(\sigma)d\sigma \quad (7)$$

Finally, an activity coefficient $\gamma_i$ of the molecule $X_i$ in the system S can be obtained from Equation (8) using the chemical potential $\mu_S^{Xi}$.

[Eq. 6]

$$\ln(\gamma_i) = \frac{\left(\mu_S^{Xi}(x_i) - \mu_p^{Xi}\right)}{RT} \quad (8)$$

In addition, $\mu_p^{Xi}$ is a chemical potential in a pure system formed only from the molecule $X_i$, and $\mu_S^{Xi}(x_i)$ is a chemical potential in a state in which the molecule $X_i$ is dissolved in the system S at a molar ratio of $x_i$.

The chemical potential $\mu_p^{Xi}$ in the pure system can be obtained in a manner such that the $\mu_s(\sigma)$ is obtained from Equation (5) assuming that the system S is formed only from the molecule $X_i$ and is then substituted in Equation (7).

The combinatorial term $\mu_{CS}^{Xi}$ in Equation (7) can be represented by the following equation. When the solvent system is formed from small molecules, the $\mu_{CS}^{Xi}$ is represented as shown below.

[Eq. 7]

$$\mu_{CS}^{Xi} = \quad (9)$$
$$(\tilde{\lambda}_0 - \tilde{\lambda}_1)\ln(r_i) + \lambda_1\left(1 - \frac{r_i}{\bar{r}} + \ln\left(\frac{r_i}{\bar{r}}\right)\right) + \lambda_2\left(1 - \frac{q_i}{\bar{q}} + \ln\left(\frac{q_i}{\bar{q}}\right)\right) - \tilde{\lambda}_2 \ln(r_i)$$

In the above equation, $\hat{\lambda}_0$, $\hat{\lambda}_1$, $\hat{\lambda}_2$, and $\hat{\lambda}_3$ are common parameters. $r_i$ represents the volume of the molecule $X_i$, and $q_i$ represents the surface area of the molecule $X_i$. In addition, $\bar{r}$ and $\bar{q}$ are represented by the following respective equations.

[Eq. 8]

$$\bar{r} = \Sigma_i x_i r_i \quad (10)$$

$$\bar{q} = \Sigma_i x_i q_i \quad (11)$$

In addition, when the solvent system is formed from macromolecules, the $\mu_{CS}^{Xi}$ is represented as shown below in accordance with Elbro.

[Eq. 9]

$$\mu_{CS}^{Xi} = RT\left(\ln\left(\frac{\varphi_i^X}{x_i}\right) + 1 - \frac{\varphi_i^X}{x_i}\right) \quad (12)$$

Equation (12) represents the contribution to the combinatorial term from the free volume in the macromolecule proposed by Elbro. In the above equation, $x_i$ represents a molar fraction of the molecule $X_i$, and $\varphi_i^F$ represents the fraction of free volume ratio. $\varphi_i^F$ is represented as shown below.

[Eq. 10]

$$\varphi_i^F = \frac{x_i(v_i - v_i^*)}{\Sigma_j\, x_j(v_j - v_j^*)} \quad (13)$$

In the above equation, $v_i$ represents a molar volume, and $v_i^*$ represents a molecular hard-core volume.

When the Avogadro number is represented by $N_A$, the following equation including a molecular weight $M_i$ and a density $\rho_i$ of the molecule $X_i$ is satisfied.

[Eq. 11]

$$v_i = \frac{M_i}{N_A \rho_i} \quad (14)$$

In addition, $v_i^*$ can be obtained by the quantum chemistry calculation.

In the macromolecule used as the solvent, when i=0 is assumed, in this calculation, the molecular weight $M_0$ and $\rho_0$ are set to 10,000 and 1.38 g/cc, respectively. $\rho_0$=1.38 g/cc corresponds to the density of a general poly(ethylene terephthalate) (PET).

The variables used in the above calculations are shown below.

$X_i$: chemical compound i considered as solute
$x_i$: mol fraction of compound i in mixture
$\sigma$: screening charge density on the segment
$p^{Xi}(\sigma)$: COSMO-RS sigma profile of a compound Xi
$p_S(\sigma)$: COSMO-RS sigma profile of a system
R: Gas constant
T: Temperature
$a_{eff}$: COSMO-RS effective contact area
$\mu_S(\sigma)$: a measure of the affinity of the system S to a surface of polarity $\sigma$
$\mu_S^{Xi}$: chemical potential for species Xi in system S
$\mu_{CS}^{Xi}$: COSMO-RS combinatorial contribution for species Xi in system S
$\gamma_i$: activity coefficient
$r_i$: volume of compound Xi
$q_i$: surface area of compound Xi In addition, when the cloth, such as a blended cloth, used as an evaluation object includes a plurality of chemical structures, a chemical structure having a largest content (in terms of percent by weight) is used as the object for simulation.

In the above calculations, the following documents may be used as references for the calculation of the activity coefficient. In addition, the software used for the calculation of the COSMO-RS method is BIOVIA COSMOtherm 2022.

Klamt, A., J. Phys. Chem. 99, 2224 (1995)
Klamt, A.; Jonas, V.; Burger, T.; Lohrenz, J. C., J. Phys. Chem. A 102, 5074 (1998).
Eckert, F. and A. Klamt, AIChE Journal, 48, 369 (2002).

In addition, the combinatorial term by the free volume in the resin can be incorporated in the chemical potential by Elbro method described in the following document.

Elbro, H. S.; Fredenslund, A.; Rasmussen, P. A., Macromolecules 23, 4707 (1990)

TABLE 4

|  |  |  | EXAMPLE 1 | EXAMPLE 2 | EXAMPLE 3 | EXAMPLE 4 | EXAMPLE 5 | EXAMPLE 6 |
|---|---|---|---|---|---|---|---|---|
| INK COMPOSITION |  | NAME | Ink-1 | Ink-2 | Ink-3 | Ink-3 | Ink-1 | Ink-1 |
|  |  | DYE TYPE 1 | DOr25 | DR60 | DR60 | DR60 | DOr25 | DOr25 |
|  |  | DYE TYPE 2 | DB360 | DB359 | — | — | DB360 | DB360 |
|  |  | DYE TYPE 3 | DY54 | DY54 | — | — | DY54 | DY54 |
|  |  | DYE TYPE 4 | SO60 | DV28 | — | — | SO60 | SO60 |
|  |  | DYE TYPE 5 | DV28 | — | — | — | DV28 | DV28 |
| PRE-TREATMENT LIQUID COMPOSITION | NAME |  | — | — | — | — |  | — |
|  | RESIN EMULSION |  | — | — | — | — |  | — |
|  | RESIN MONOMER | TEREPHTHALIC ACID | — | — | — | — | 1 | — |
|  |  | ISOPHTHALIC ACID | — | — | — | — |  | — |
|  |  | ETHYLENE GLYCOL | — | — | — | — | 1 | — |
|  |  | NEOPENTYL GLYCOL | — | — | — | — |  | — |
|  | CROSS-LINKING AGENT | HEXAMETHYLENE DIISOCYANATE | — | — | — | — | — | — |
| CLOTH FOR PRINTING |  |  | COTTON | PP | COTTON | PP | COTTON | COTTON BLEND |
| Ln (gamma) | CLOTH | DYE TYPE 1 | 4.4 | 0.2 | 4.9 | 0.2 | 4.4 | 4.4 |
|  |  | DYE TYPE 2 | 4.6 | −0.1 | — | — | 4.6 | 4.6 |
|  |  | DYE TYPE 3 | 3.2 | 0.4 | — | — | 3.2 | 3.2 |
|  |  | DYE TYPE 4 | 4.9 | −0.2 | — | — | 4.9 | 4.9 |
|  |  | DYE TYPE 5 | 3.6 | — | — | — | 3.6 | 3.6 |
|  | RESIN IN PRE-TREATMENT LIQUID COMPOSITION | DYE TYPE 1 | — | — | — | — | −1.5 | — |
|  |  | DYE TYPE 2 | — | — | — | — | −0.9 | — |
|  |  | DYE TYPE 3 | — | — | — | — | −2.4 | — |
|  |  | DYE TYPE 4 | — | — | — | — | −2.2 | — |
|  |  | DYE TYPE 5 | — | — | — | — | −1.9 | — |
| EVALUATION |  | DISCOLORATION | B | A | B | A | AAA | B |
|  |  | TEXTURE | AA | B | AA | B | B | AA |

TABLE 5

|  |  | EXAMPLE 7 | EXAMPLE 8 | EXAMPLE 9 | EXAMPLE 10 | EXAMPLE 11 |
|---|---|---|---|---|---|---|
| INK COMPOSITION | NAME | Ink-1 | Ink-1 | Ink-4 | Ink-4 | Ink-3 |
|  | DYE TYPE 1 | DOr25 | DR60 | DY232 | DY232 | DR60 |
|  | DYE TYPE 2 | DB360 | DB360 | — | — | — |
|  | DYE TYPE 3 | DY54 | DY54 | — | — | — |
|  | DYE TYPE 4 | SO60 | SO60 | — | — | — |
|  | DYE TYPE 5 | DV28 | DV28 | — | — | — |

TABLE 5-continued

|  |  |  | EXAMPLE 7 | EXAMPLE 8 | EXAMPLE 9 | EXAMPLE 10 | EXAMPLE 11 |
|---|---|---|---|---|---|---|---|
| PRE-TREATMENT LIQUID COMPOSITION | NAME |  | PT-2 | PT-3 | PT-3 | PT-4 | PT-3 |
|  | RESIN EMULSION |  | PES | PES | PES | PES | PES |
|  | RESIN MONOMER | TEREPHTHALIC ACID | 3 | 1 | 1 | 1 | 1 |
|  |  | ISOPHTHALIC ACID | 3 | 1 | 1 | 1 | 1 |
|  |  | ETHYLENE GLYCOL | 1 | 1 | 1 | 1 | 1 |
|  |  | NEOPENTYL GLYCOL | 5 | 1 | 1 | 1 | 1 |
|  | CROSS-LINKING AGENT | HEXAMETHYLENE DIISOCYANATE | — | — | — | 1 | — |
| CLOTH FOR PRINTING |  |  | COTTON | COTTON | COTTON | COTTON | COTTON |
| Ln (gamma) | CLOTH | DYE TYPE 1 | 4.4 | 4.4 | 8.0 | 8.0 | 4.9 |
|  |  | DYE TYPE 2 | 4.6 | 4.6 | — | — | — |
|  |  | DYE TYPE 3 | 3.2 | 3.2 | — | — | — |
|  |  | DYE TYPE 4 | 4.9 | 4.9 | — | — | — |
|  |  | DYE TYPE 5 | 3.6 | 3.6 | — | — | — |
|  | RESIN IN PRE-TREATMENT LIQUID COMPOSITION | DYE TYPE 1 | −0.3 | −1.1 | −0.8 | −1.3 | −1.5 |
|  |  | DYE TYPE 2 | 0.4 | −0.4 | — | — | — |
|  |  | DYE TYPE 3 | −0.9 | −1.7 | — | — | — |
|  |  | DYE TYPE 4 | −0.9 | −1.5 | — | — | — |
|  |  | DYE TYPE 5 | −0.5 | −1.2 | — | — | — |
| EVALUATION |  | DISCOLORATION | A | AA | AA | AAA | AAA |
|  |  | TEXTURE | A | A | B | B | A |

TABLE 6

|  |  |  | EXAMPLE 12 | EXAMPLE 13 | EXAMPLE 14 | EXAMPLE 15 | EXAMPLE 16 | EXAMPLE 17 |
|---|---|---|---|---|---|---|---|---|
| INK COMPOSITION |  | NAME | Ink-5 | Ink-6 | Ink-7 | Ink-2 | Ink-1 | Ink-1 |
|  |  | DYE TYPE 1 | DY54 | DV28 | DBr27 | DR60 | DOr25 | DOr25 |
|  |  | DYE TYPE 2 | — | — | — | DB359 | DB360 | DB360 |
|  |  | DYE TYPE 3 | — | — | — | DY54 | DY54 | DY54 |
|  |  | DYE TYPE 4 | — | — | — | DV28 | SO60 | SO60 |
|  |  | DYE TYPE 5 | — | — | — | — | DV28 | DV28 |
| PRE-TREATMENT LIQUID COMPOSITION | NAME |  | PT-3 | PT-3 | PT-3 | PT-2 | PT-3 | PT-3 |
|  | RESIN EMULSION |  | PES | PES | PES | PES | PES | PES |
|  | RESIN MONOMER | TEREPHTHALIC ACID | 1 | 1 | 1 | 3 | 1 | 1 |
|  |  | ISOPHTHALIC ACID | 1 | 1 | 1 | 3 | 1 | 1 |
|  |  | ETHYLENE GLYCOL | 1 | 1 | 1 | 1 | 1 | 1 |
|  |  | NEOPENTYL GLYCOL | 1 | 1 | 1 | 5 | 1 | 1 |
|  | CROSS-LINKING AGENT | HEXAMETHYLENE DIISOCYANATE | — | — | — | — | — | — |
| CLOTH FOR PRINTING |  |  | COTTON | COTTON | COTTON | COTTON | PP | COTTON BLEND |
| Ln (gamma) | CLOTH | DYE TYPE 1 | 3.2 | 3.6 | 9.0 | 4.9 | 6.5 | 4.4 |
|  |  | DYE TYPE 2 | — | — | — | 3.3 | 8.0 | 4.6 |
|  |  | DYE TYPE 3 | — | — | — | 3.2 | 0.4 | 3.2 |
|  |  | DYE TYPE 4 | — | — | — | 3.6 | −1.8 | 4.9 |
|  |  | DYE TYPE 5 | — | — | — | — | −0.2 | 3.6 |
|  | RESIN IN PRE-TREATMENT LIQUID COMPOSITION | DYE TYPE 1 | −4.7 | −1.2 | −1.2 | −0.8 | −1.1 | −1.1 |
|  |  | DYE TYPE 2 | — | — | — | −0.6 | −0.4 | −0.4 |
|  |  | DYE TYPE 3 | — | — | — | −0.9 | −1.7 | −1.7 |
|  |  | DYE TYPE 4 | — | — | — | −0.5 | −1.5 | −1.5 |
|  |  | DYE TYPE 5 | — | — | — | — | −1.2 | −1.2 |
| EVALUATION |  | DISCOLORATION | AAA | AAA | AAA | AA | AA | AA |
|  |  | TEXTURE | A | A | A | A | B | A |

TABLE 7

|  |  | COMPARATIVE EXAMPLE 1 | COMPARATIVE EXAMPLE 2 | COMPARATIVE EXAMPLE 3 |
|---|---|---|---|---|
| INK COMPOSITION | NAME | Ink-1 | Ink-1 | Ink-4 |
|  | DYE TYPE 1 | DOr25 | DOr25 | DY232 |
|  | DYE TYPE 2 | DB360 | DB360 | — |
|  | DYE TYPE 3 | DY54 | DY54 | — |
|  | DYE TYPE 4 | SO60 | SO60 | — |
|  | DYE TYPE 5 | DV28 | DV28 | — |

TABLE 7-continued

| | | | COMPARATIVE EXAMPLE 1 | COMPARATIVE EXAMPLE 2 | COMPARATIVE EXAMPLE 3 |
|---|---|---|---|---|---|
| PRE-TREATMENT LIQUID COMPOSITION | | NAME | — | PT-5 | — |
| | RESIN EMULSION | | | PP | |
| | RESIN MONOMER | TEREPHTHALIC ACID | — | | — |
| | | ISOPHTHALIC ACID | | | — |
| | | ETHYLENE GLYCOL | — | — | — |
| | | NEOPENTYL GLYCOL | — | — | — |
| | CROSS-LINKING AGENT | HEXAMETHYLENE DIISOCYANATE | — | — | — |
| | CLOTH FOR PRINTING | | PP | PP | COTTON |
| Ln (gamma) | CLOTH | DYE TYPE 1 | 6.5 | 6.5 | 8.0 |
| | | DYE TYPE 2 | 8.0 | 8.0 | — |
| | | DYE TYPE 3 | 0.4 | 0.4 | — |
| | | DYE TYPE 4 | −1.8 | −1.8 | — |
| | | DYE TYPE 5 | −0.2 | −0.2 | — |
| | RESIN IN PRE-TREATMENT LIQUID COMPOSITION | DYE TYPE 1 | — | 6.5 | — |
| | | DYE TYPE 2 | — | 8.0 | — |
| | | DYE TYPE 3 | — | 0.4 | — |
| | | DYE TYPE 4 | — | −1.8 | — |
| | | DYE TYPE 5 | — | −0.2 | — |
| EVALUATION | | DISCOLORATION | C | C | C |
| | | TEXTURE | B | B | B |

7. Evaluation Result

In Tables 4 to 7, the compositions of the ink compositions, the printing cloths, and the evaluation results of Examples are shown. From those results, it was found that when the ink jet printing method includes an ejection step of ejecting an ink jet ink composition containing a sublimation dye from a recording head so as to be adhered to an intermediate transfer medium A and a transfer step of transferring the sublimation dye adhered to the intermediate transfer medium A by sublimation to a cloth B, and an affinity parameter Ln (gamma) at 25° C. calculated by a COSMO-RS method between the sublimation dye and a member of a surface of the cloth B to which the sublimation transfer is performed is 5 or less, a printed matter having less discoloration can be obtained.

What is claimed is:

1. An ink jet printing method comprising:
   an ejection step of ejecting an ink jet ink composition containing at least one type of sublimation dye from a recording head so as to be adhered to an intermediate transfer medium A; and
   a transfer step of transferring the sublimation dye adhered to the intermediate transfer medium A by sublimation to a cloth B,
   wherein when an affinity parameter Ln (gamma) at 25° C. between the sublimation dye and a member of a surface of the cloth B to which the sublimation transfer is performed is calculated by a COSMO-RS method, the affinity parameter Ln (gamma) at 25° C. is 5 or less and
   wherein when the member includes a poly(ethylene terephthalate), a content of the poly(ethylene terephthalate) with respect to a total mass of the cloth B is more than 0 to 5 percent by mass.

2. The ink jet printing method according to claim 1, wherein the Ln (gamma) is 3 or less.

3. The ink jet printing method according to claim 1, wherein the Ln (gamma) is 0 or less.

4. The ink jet printing method according to claim 1, wherein the member includes at least one selected from the group consisting of a cotton and a polypropylene.

5. The ink jet printing method according to claim 1, wherein the ink jet ink composition contains at least two types of the sublimation dyes, and
   the Ln's (gamma) with respective to the respective sublimation dyes are each 5 or less.

6. The ink jet printing method according to claim 1, further comprising, before the transfer step:
   a pre-treatment step of adhering a pre-treatment liquid composition in advance to the surface of the cloth B to which the sublimation transfer is performed,
   wherein the pre-treatment liquid composition contains a resin including a dicarboxylic acid compound and a diol compound as constituent units.

7. The ink jet printing method according to claim 6, wherein the dicarboxylic acid compound includes terephthalic acid and isophthalic acid,
   the diol compound includes ethylene glycol, and
   a content of the ethylene glycol with respect to a total mass of the diol compound is 30 to 100 percent by mole.

8. The ink jet printing method according to claim 7, wherein the diol compound further includes a neopentyl glycol, and
   a content of the neopentyl glycol with respect to the total mass of the diol compound is more than 0 to 70 percent by mole.

9. The ink jet printing method according to claim 1, wherein the sublimation dye includes at least one selected from the group consisting of Disperse Orange 25, Disperse Blue 360, Disperse Blue 359, Disperse Yellow 54, Disperse Yellow 232, Solvent Orange 60, Disperse Violet 28, Disperse Red 60, and Disperse Brown 27.

10. The ink jet printing method according to claim 6, wherein the pre-treatment liquid composition further contains a cross-linking agent.

11. An ink jet printing set comprising:
    an ink jet ink composition containing a sublimation dye; and
    a cloth B to which the sublimation dye is transferred by sublimation,
    wherein when an affinity parameter Ln (gamma) at 25° C. between the sublimation dye and a member of a surface of the cloth B to which the sublimation transfer is performed is calculated by a COSMO-RS method, the affinity parameter Ln (gamma) at 25° C. is 5 or less, and wherein when the member includes a poly(ethylene terephthalate), a content of the poly(ethylene terephthalate) with respect to a total mass of the cloth B is more than 0 to 5 percent by mass.

12. An ink jet printing set comprising:

an ink jet ink composition containing a sublimation dye; and a pre-treatment liquid composition, wherein the pre-treatment liquid composition is a composition to perform a pre-treatment on a cloth B to which the sublimation dye is transferred by sublimation, the pre-treatment liquid composition contains resin particles, when an affinity parameter Ln (gamma) at 25° C. between the sublimation dye and the resin particles is calculated by a COSMO-RS method, the affinity parameter Ln (gamma) at 25° C. is 5 or less, and when the member includes a poly(ethylene terephthalate), a content of the poly(ethylene terephthalate) with respect to a total mass of the cloth B is more than 0 to 5 percent by mass.

* * * * *